(12) United States Patent
Jähner et al.

(10) Patent No.: US 9,827,877 B2
(45) Date of Patent: Nov. 28, 2017

(54) RELEASE DEVICE FOR THE LOCKING MEANS OF A SEAT RAIL

(71) Applicant: KEIPER GMBH & CO. KG, Kaiserslautern (DE)

(72) Inventors: Falko Jähner, Bloomfield Hills, MI (US); Georg Ruess, Oberarnbach (DE); Jürgen Krebs, Rockenhausen (DE)

(73) Assignee: KEIPER GMBH & CO. KG, Kaiserslautern (DE)

( * ) Notice: Subject to any disclaimer, the term of this patent is extended or adjusted under 35 U.S.C. 154(b) by 403 days.

(21) Appl. No.: 14/366,942

(22) PCT Filed: Nov. 21, 2012

(86) PCT No.: PCT/EP2012/073258
§ 371 (c)(1),
(2) Date: Jun. 19, 2014

(87) PCT Pub. No.: WO2013/092089
PCT Pub. Date: Jun. 27, 2013

(65) Prior Publication Data
US 2014/0348574 A1    Nov. 27, 2014

(30) Foreign Application Priority Data

Dec. 20, 2011   (DE) .................... 10 2011 121 557
Mar. 27, 2012   (DE) .................... 10 2012 006 060

(51) Int. Cl.
*B60N 2/07*    (2006.01)
*B60N 2/08*    (2006.01)
*B60N 2/06*    (2006.01)

(52) U.S. Cl.
CPC ............ *B60N 2/0818* (2013.01); *B60N 2/06* (2013.01); *B60N 2/0705* (2013.01); *B60N 2/085* (2013.01);
(Continued)

(58) Field of Classification Search
CPC ...... B60N 2/06; B60N 2/0705; B60N 2/0715; B60N 2/0818; B60N 2/085; B60N 2/0856;
(Continued)

(56) References Cited

U.S. PATENT DOCUMENTS 3,722,316 A *  3/1973  Hawkins ............... B25B 23/142
                                                        74/524
3,893,354 A *  7/1975  Knoll .................. B25B 23/1427
                                                         81/483
(Continued)

FOREIGN PATENT DOCUMENTS

DE        2411414        9/1974
DE      20208719 U1     12/2003
(Continued)

OTHER PUBLICATIONS

Specification Translation of DE 2411414. Bertrand Faure Puteaux ETS. Locking Device for Slides. Sep. 19, 1974.*
(Continued)

*Primary Examiner* — Josh Skroupa
(74) *Attorney, Agent, or Firm* — The Dobrusin Law Firm, P.C.

(57) ABSTRACT

A release device for the upper rail and the lower rail of a longitudinal seat adjustment system of a motor vehicle seat, the release device having a lever rotatably supported on the upper rail of the seat. An end of the lever interacts with the locking means and optionally releases the locking means. A handle is provided at the other end. If the handle is operated, the lever moves relative to the upper rail from a passive position to a release position and moves the locking means from a locking position to a releasing position. So the release device automatically moves into a passive position of the release device, a spring element is provided, which preloads (Continued)

the lever into the passive position of the lever. The spring element additionally supports the lever on the upper rail.

8 Claims, 5 Drawing Sheets

(52) U.S. Cl.
CPC ..... *B60N 2/0856* (2013.01); *Y10T 403/32442* (2015.01); *Y10T 403/32483* (2015.01); *Y10T 403/595* (2015.01)

(58) Field of Classification Search
CPC ..... Y10T 403/32442; Y10T 403/32475; Y10T 403/32483; Y10T 403/32508; Y10T 403/32524; Y10T 403/595; Y10T 403/602; Y10T 403/606; Y10T 403/608; Y10T 403/7079
USPC ............ 403/106, 109.2, 109.3, 109.6, 109.8, 403/322.4, 327, 329, 330, 378; 296/65.15
See application file for complete search history.

(56) References Cited

U.S. PATENT DOCUMENTS

| | | | | |
|---|---|---|---|---|
| 4,568,054 | A | * | 2/1986 | Degremont .......... B60N 2/0825 248/393 |
| 5,806,825 | A | | 9/1998 | Couasnon |
| 8,469,327 | B2 | | 6/2013 | Hayashi |
| 2011/0042540 | A1 | | 2/2011 | Becker et al. |
| 2013/0168524 | A1 | * | 7/2013 | Aoi ...................... B60N 2/0705 248/430 |

FOREIGN PATENT DOCUMENTS

| | | | | |
|---|---|---|---|---|
| DE | 202007001394 | U1 | 7/2008 | |
| DE | 102009060431 | A1 * | 6/2011 | ........... B60N 2/0705 |
| DE | 102012006060.2 | | 3/2012 | |
| DE | 102011121557.7 | | 3/2013 | |
| EP | 1048513 | A2 | 11/2000 | |
| FR | 2767096 | A1 | 2/1999 | |
| GB | 457495 | A * | 11/1936 | ........... B60N 2/0818 |
| GB | 754290 | A * | 8/1956 | ........... B60N 2/0705 |
| JP | H07257244 | A | 10/1995 | |
| JP | 2002-154356 | A | 5/2002 | |
| JP | 2004051082 | A | 2/2004 | |
| JP | 2006-315531 | A | 11/2006 | |
| JP | 2008-184033 | A | 8/2008 | |
| WO | 2007/095762 | A1 | 8/2007 | |
| WO | 2013/092089 | A1 | 6/2013 | |

OTHER PUBLICATIONS

Japanese Office Action dated May 11, 2015 for Japanese Patent Application No. 2014-547806.
International Search Report dated Apr. 3, 2013 for PCT/EP2012/073258.
English translation of the international preliminary report on patentability for Application No. PCT/EP2012/073258, dated Jul. 11 2014.
German Office Action dated Apr. 17, 2015 for Application No. 102012006060.2.
Japanese Office Action dated Jan. 17, 2017, for Japanese Application No. 2014-547806.
Japanese examination report for Japanese Patent Application No. 2016-121688 dated May 16, 2017.

* cited by examiner

RELEASE DEVICE FOR THE LOCKING MEANS OF A SEAT RAIL

The present invention relates to a release device for the locking means of a seat rail.

Nowadays, seats in motor vehicles generally have an upper rail and a lower rail along which said seats may be adjusted, in particular in the direction of travel and counter to the direction of travel of the motor vehicle. A locking means is provided in order to be able to lock the vehicle seat in a specific longitudinal position, said locking means fixing the position of the two rails relative to one another. Said locking means thus has to be released as required for adjusting the longitudinal position of the vehicle seat. To this end, a release device is provided, but said release device is often designed in a complex manner and is difficult to mount in vehicle seats according to the prior art.

It was, therefore, the object of the present invention to provide a release device which does not have the drawbacks of the prior art.

The object is achieved by a release device which has a lever, a handle being provided at one end thereof and the other end thereof cooperating with a locking means, wherein the release device has a spring means which pretensions the lever into the passive position thereof and at the same time the spring means is used to fasten the lever to the upper rail of the motor vehicle seat, in particular to mount said lever in a rotatable manner.

The present invention relates to a release device for the upper rail and the lower rail of a longitudinal seat adjustment system of a motor vehicle seat. A locking means is provided between the upper rail which is generally connected to the vehicle seat and the lower rail which is generally connected to the body of the motor vehicle, said locking means locking the vehicle seat in the desired position. Said locking means has to be released in order to be able to adjust the vehicle seat. To this end, a release device is provided, said release device being manually actuated in the present case. Said release device has a lever which is preferably rotatably mounted on the upper rail of the vehicle seat. One and of said lever cooperates with the locking means and optionally releases said locking means. A handle is provided at the other end. If this handle is actuated, the lever moves or preferably rotates relative to the upper rail from its passive position into its released position and at the same time transfers the locking means from its locked position into a released position. In order to ensure that the release device automatically moves into its passive position in which it does not cooperate with the locking means in a releasing manner, a spring means is provided, said spring means pretensioning the lever into its passive position. Moreover, said spring means prevents rattling noise from being produced by the lever. According to the invention, therefore, it is provided that the spring means additionally undertakes the function of mounting the lever on the upper rail. As a result, parts and thus weight are saved and the mounting simplified.

The spring means is, for example, a leg spring which is produced, for example, from a wire. At one end the leg spring is designed such that the wire passes through both a recess in the lever and a recess in the upper rail and, as a result, functions as a rotary bearing.

Alternatively, the spring means is designed as a leaf spring which, on the one hand, is connected to the lever and, on the other hand, is connected to the upper rail.

Preferably, the lever is a bent sheet metal part produced, in particular, in one piece. Preferably, the lever is produced from metal. Preferably, the upper rail at least partially receives the lever. Preferably, the lever has only a small amount of clearance inside the upper rail, in particular transversely to the direction of adjustment of the vehicle seat.

Preferably, the end of the lever which does not cooperate with the locking means is connected to a handle by a positive, non-positive and/or material connection. Preferably, the handle is fitted onto or into the lever and is connected thereto positively and/or non-positively, in particular by a latching connection. Preferably, the lever and/or the handle have means for a latching connection. Further preferably, the handle and/or the lever have safety means by which the handle is prevented from being able to be released from the lever by inappropriate action.

Particularly preferably, the release device has a safety means which prevents the lever from being damaged in the case of inappropriate loading of the handle. For example, said safety means is a connection which is automatically released when a specific load is exceeded, in particular when a specific bending moment is exceeded, so that the handle is no longer fixedly connected to the lever. As a result, damage to the release device and/or the locking means is prevented.

The person skilled in the art understands that a vehicle seat is generally mounted with two upper rails and two lower rails, wherein each upper rail and/or lower rail has a release device according to the invention, which is nevertheless preferably actuated by a common handle.

The invention is described hereinafter with reference to FIGS. 1-5c. These descriptions are provided merely by way of example and do not limit the general inventive idea.

Figure 1:
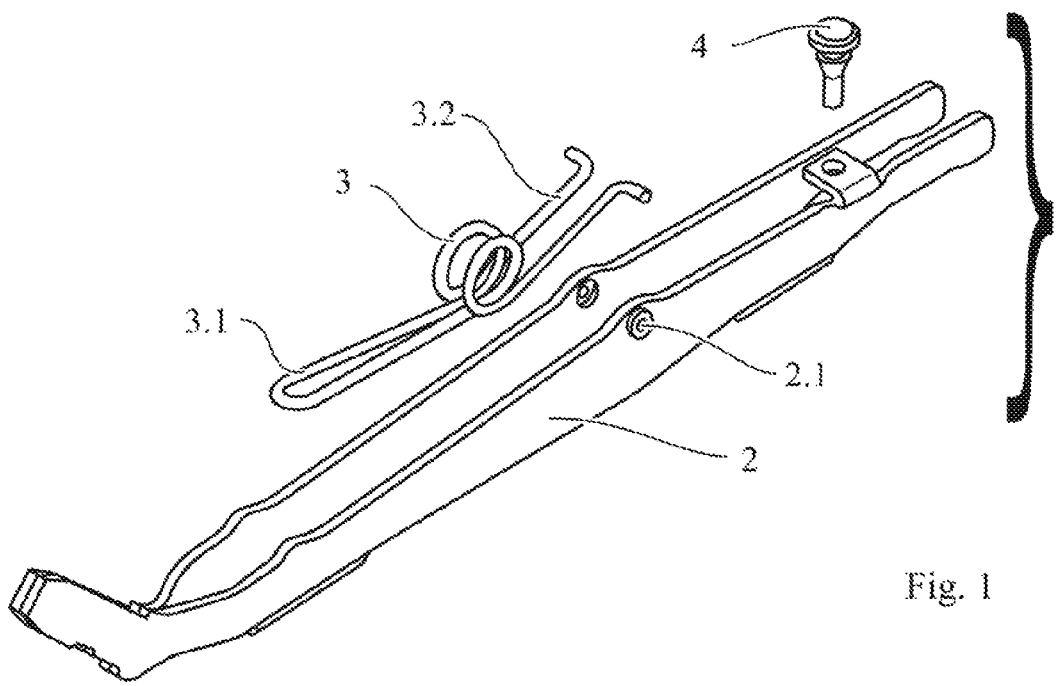
FIG. 1 shows the release device according to the invention.
Figure 2:
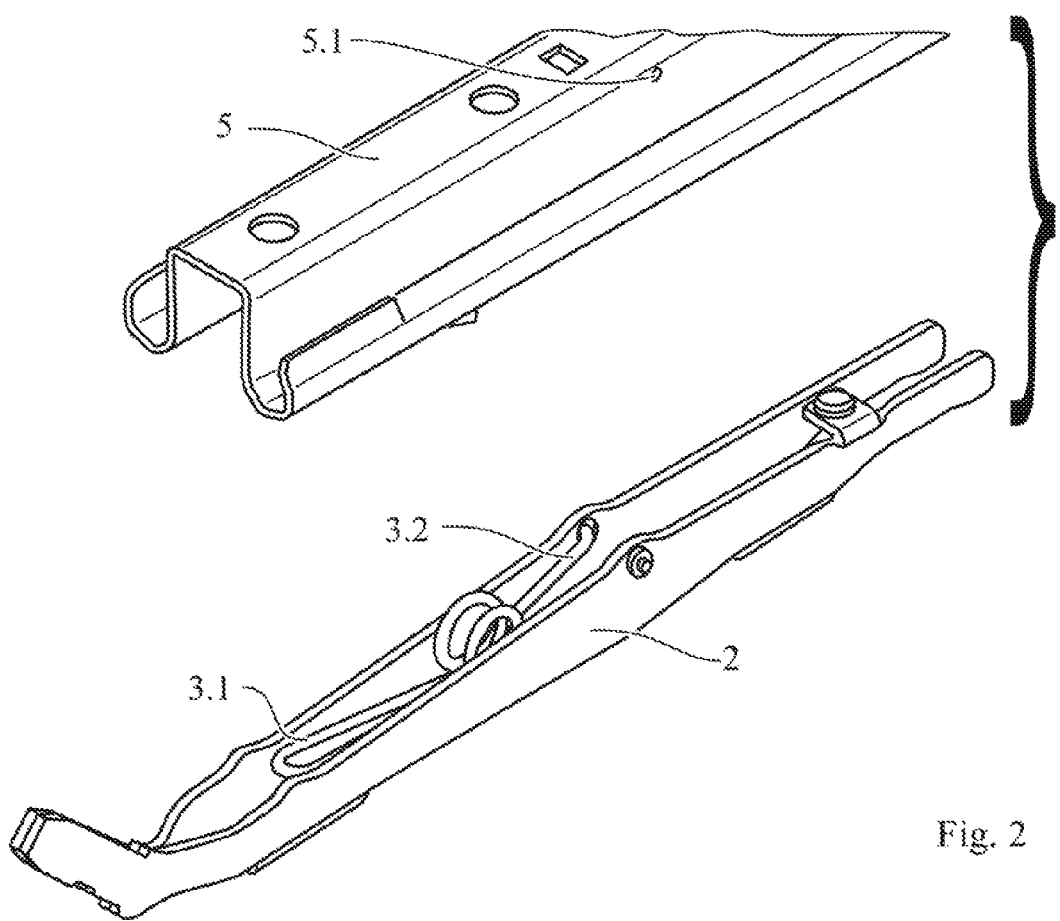
FIG. 2 shows the mounting of the release device on the upper rail.
Figure 3A:
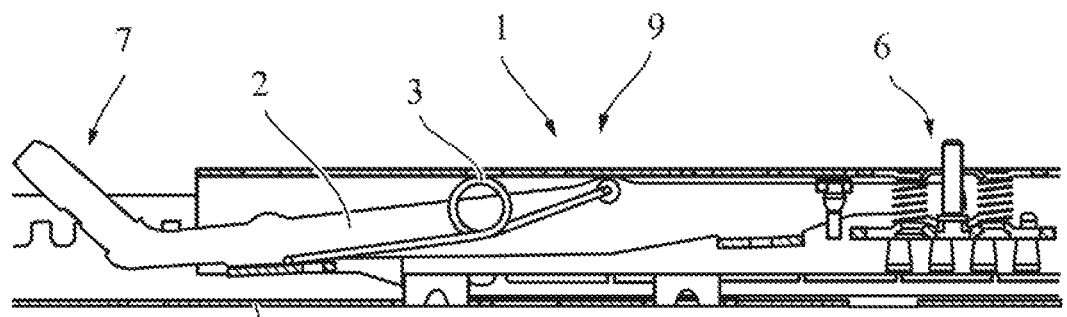

FIGS. 3a and b show the locking means according to FIGS. 1 and 2 in the passive position thereof and the released position thereof.

Figure 4A:
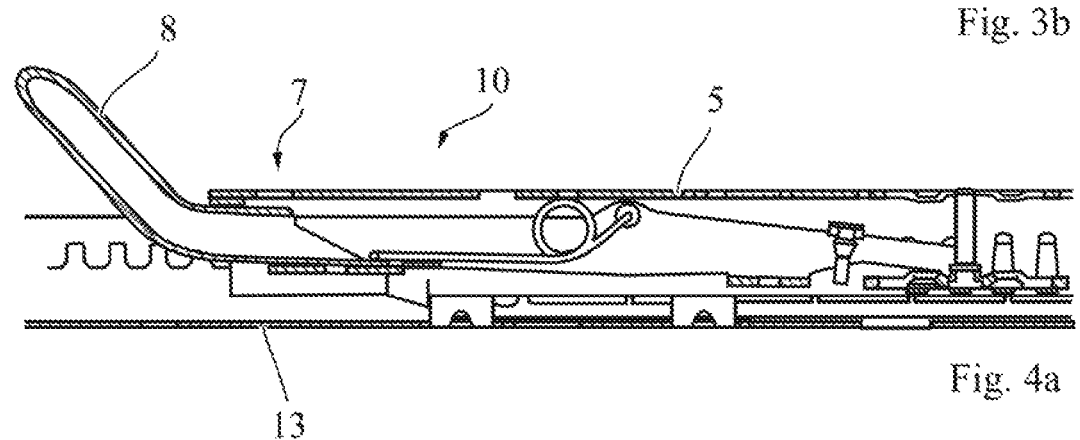
Figure 4B:
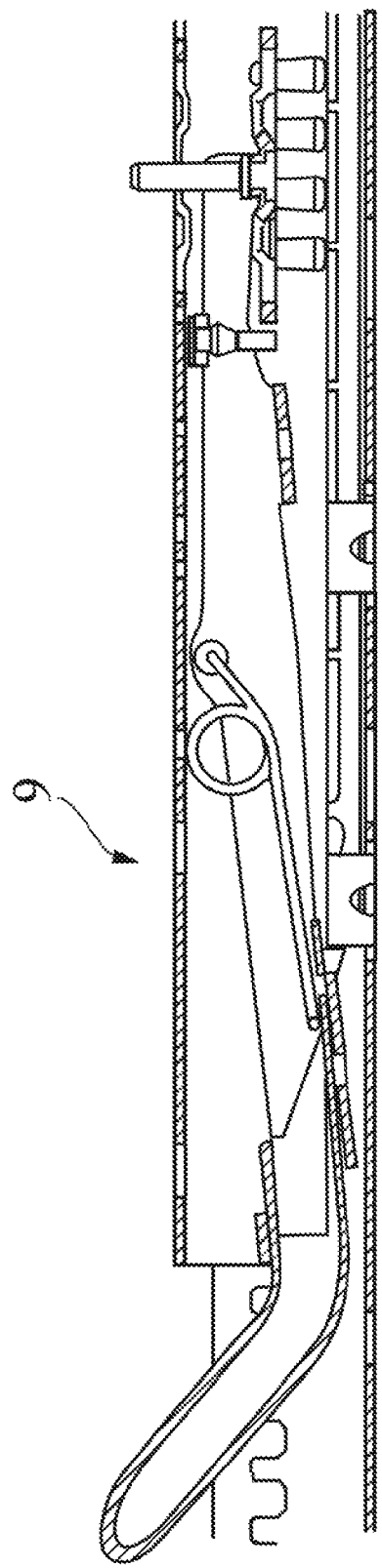
Figure 4C:
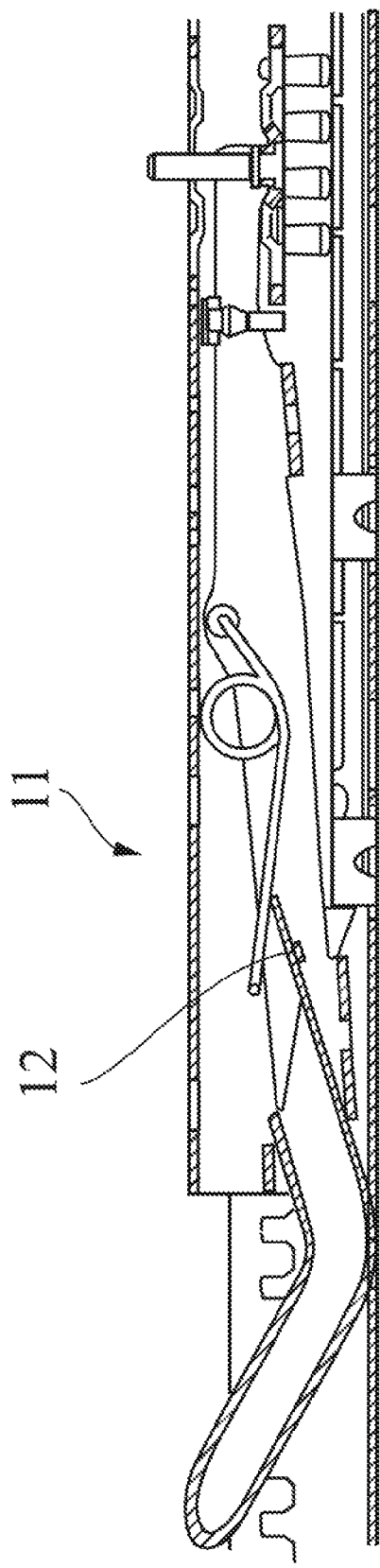

FIGS. 4a-4c show the release device according to FIGS. 3a and b, which is provided with a handle.

Figure 5A:
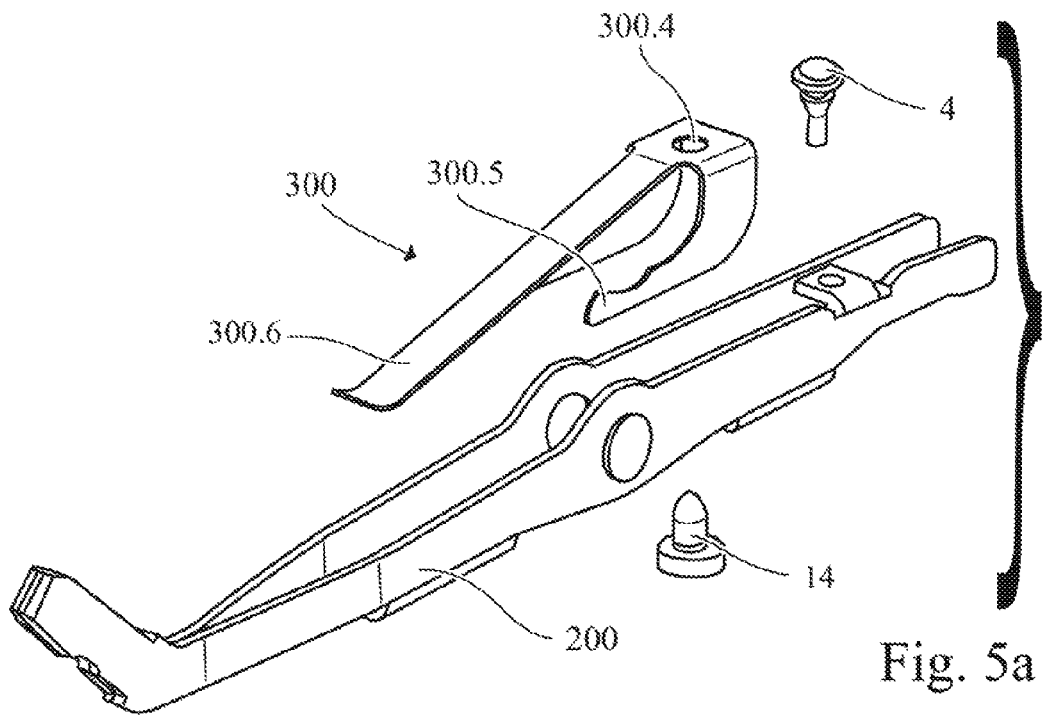
Figure 5B:
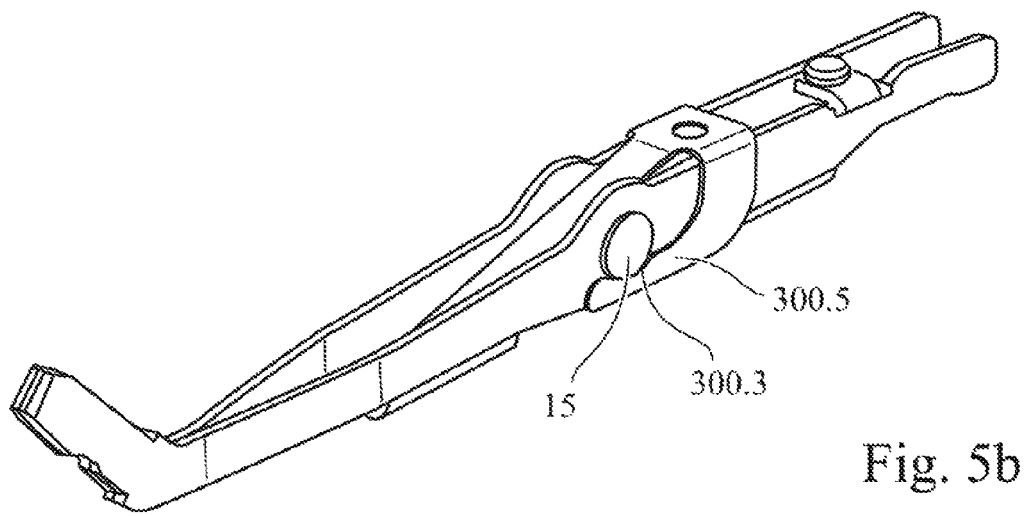
Figure 5C:
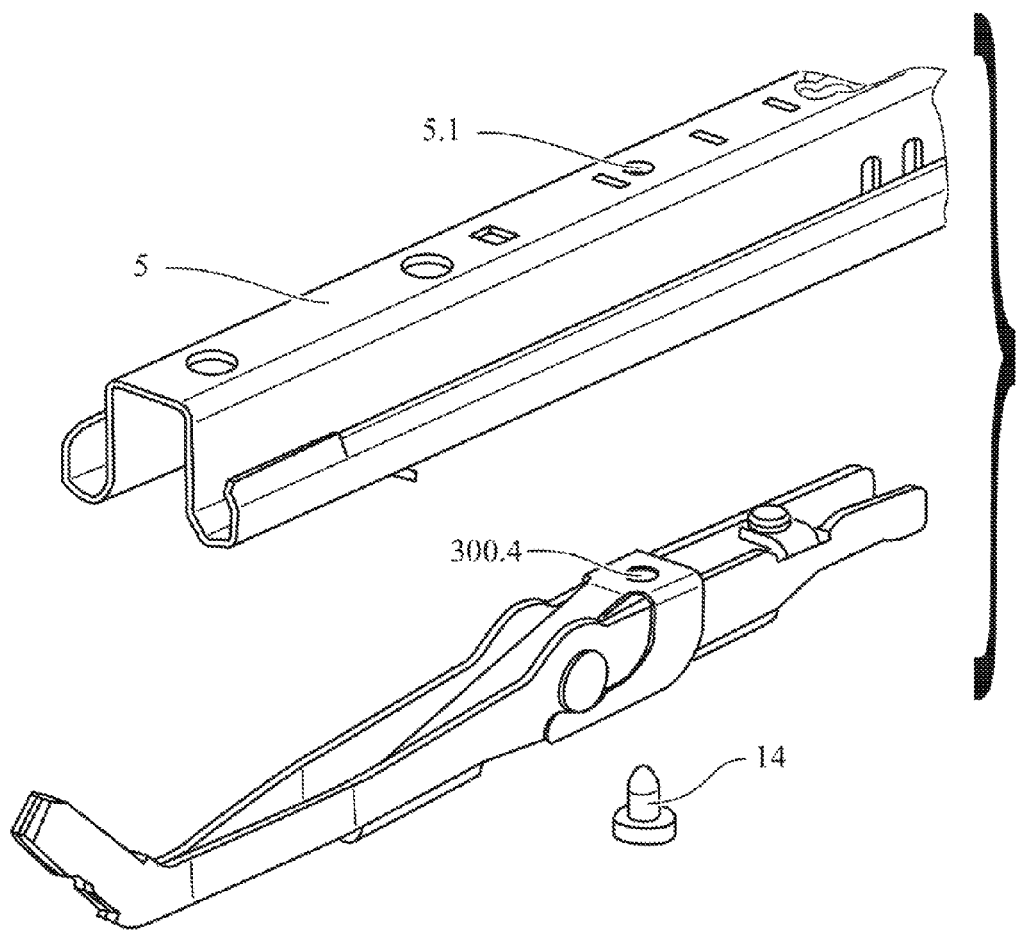

FIGS. 5a-5c show a further embodiment of the release device according to the invention.

FIG. 1 shows the release device according to the invention which has a lever 2. Said lever is preferably produced from sheet metal, in particular in one piece, by the metal sheet initially being stamped out and then bent. Said lever in each case has a recess 2.1 to the right and to the left. Moreover, the release device is provided with a spring means 3, in this case a leg spring. Said leg spring has a first end 3.1 and a second end 3.2. Moreover, the release device is preferably provided with a damper 4 which is inserted into an opening provided on the lever 2.

As may be derived in particular from FIG. 2, the wire of the end 3.2 of the leg spring 3 is inserted into the recesses 2.1 of the lever 2 and protrudes therefrom to such an extent that when the lever is inserted into an upper rail 5 said protruding ends are latched into the recesses 5.1 thereof. As a result, the spring means 3 forms a rotary bearing for the lever 2 relative to the upper rail 5. The end 3.1 of the spring means 3 is supported on the lever 2.

FIG. 3a shows the release device in cooperation with a locking means 6 which is known to the person skilled in the art and which locks the upper rail 5, which is generally connected to the vehicle seat, relative to a lower rail 13, which is connected to the body of the vehicle seat. In FIG. 3a, the release means is in its passive position into which it is pretensioned by the spring means 3 and in which it does not cooperate in a releasing manner with the locking means 6. The person skilled in the art recognizes that the lever 2 has a connecting region 7 to which a handle may be connected, in particular positively and/or non-positively.

Figure 3B:
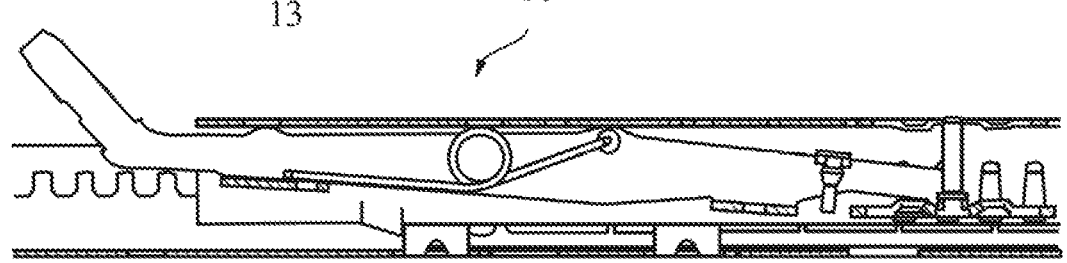

FIG. 3b shows the embodiment according to FIG. 3a, wherein the lever 2 has now been rotated clockwise upwards and, as a result, the locking means 6 is actuated such that it no longer acts in a locking manner, so that the upper rail is able to be adjusted relative to the lower rail. The lever 2 in this case is rotated about the rotary bearing which is formed by the spring means 3.

The release device according to FIGS. 3a and 3b is substantially shown in FIGS. 4a and 4b, wherein FIG. 4a shows the release device in its released position and FIG. 4b shows the release device in its passive position. In the present case, a handle is fitted into or onto the lever 2 and is thus connected thereto such that the handle is not able to be removed from the lever by inappropriate action. The spring element 3 preferably ensures that the connection between the handle 8 and the lever 2 does not produce any noise. Preferably, a fastening means 12, in particular a latching fastening means, is provided between the handle 8 and the lever 2. Said fastening means 12 between the handle 8 and the lever 2 is preferably designed such that the handle 8, as shown in FIG. 4c, is released from the lever when the handle is inappropriately actuated, i.e. for example is rotated too far counterclockwise. Preferably, the fastening means 12 is then released from the lever 2 so that the lever 2 and/or the ensuing mechanism is not damaged. The person skilled in the art understands that such a "set rupture point" may also be provided at a different point of the device according to the invention. The person skilled in the art also understands that the connection between the handle 8 and the lever 2, the fastening means 12 and/or the spring means 3 may be designed such that the spring 3 returns the handle 8 and/or the fastening means 12 into its original position (see FIG. 4b) as soon as the inappropriate loading is no longer applied to the lever 8. The release device is then able to be used again undamaged.

A further embodiment of the device according to the invention is shown in FIGS. 5a-c. In the present case, the spring means is designed as a leaf spring, one end thereof being connected to the lever 200. The end 300.5 is connected to the lever 200, in the present case by a projection 15 which is provided on the lever 200. The other end 300.6 of the leaf spring is in turn supported on the lever 200. Moreover, the leaf spring has a recess 300.4. Said recess is connected to the upper rail 5 by a fastening means 14, for example a screw 14 preferably with a self-tapping thread, wherein the screw 14 engages in the recess 5.1 of the upper rail 5. Moreover, even in this embodiment a damper 4 is preferably provided, by which the noise development of the release device according to the invention is intended to be at least reduced. In all other respects, reference is made to the embodiments relating to the above figures.

LIST OF REFERENCE NUMERALS

1 Release device
2 Lever
2.1 Recess for the spring means 3
3 Spring means
3.1 First leg
3.2 Second leg
3.3 Positive connection means, indentation
4 Damper
5 Upper rail
5.1 Recess in the upper rail
6 Locking means
7 Connecting region for a handle 8
8 Handle
9 Passive position
10 Released position
11 Inappropriate position
12 Fastening means
13 Lower rail
14 Fastening means
15 Fastening means, projection
200 Lever
300 Spring means
300.4 Recess, recess with thread
300.5 End
300.6 Other end

The invention claimed is:

1. A release device which has a lever, a handle being provided at one end thereof and the other end thereof cooperating with a locking means,
   wherein the release device has a spring means which pretensions the lever into a passive position thereof;
   wherein the spring means is adapted to fasten and mount in a rotatable manner the lever to an upper rail of a motor vehicle seat;
   wherein a latching fastening means is provided between the handle and the lever, wherein the latching fastening means is designed such that the handle is released from the lever when the handle is inappropriately actuated by a rotation in a direction towards a lower rail;
   wherein the latching fastening means is then released from the lever so that the lever is undamaged; and
   wherein spring means is designed such that the spring means returns at least one of the handle or the latching fastening means into its original position as soon as an inappropriate loading is no longer applied to the lever; and
   wherein the spring means is a leg spring which is produced from a wire, being designed such that the wire passes through both a recess in the lever and a recess in the upper rail.

2. The release device of claim 1, wherein the locking means is adapted to releasably lock the upper rail to the lower rail.

3. The release device of claim 1, wherein the wire of the leg spring functions as a rotary bearing as a result of the wire passing through both the recess in the lever and the recess in the upper rail.

4. The release device of claim 1, wherein the spring means is designed as a leaf spring which is connected to the lever and is adapted to be connected to the upper rail.

5. The release device of claim 1, wherein the lever is a bent sheet metal part produced in one piece.

6. The release device of claim 1, wherein the lever is adapted to be at least partially received by the upper rail.

7. The release device of claim 1, wherein the end of the lever which does not cooperate with the locking means is connected to the handle by a positive, non-positive, and/or material connection.

8. The release device of claim 7, wherein the handle is fitted onto or into the lever and is connected thereto positively and/or non-positively.

* * * * *